(12) United States Patent
Bronstein et al.

(10) Patent No.: US 12,208,663 B2
(45) Date of Patent: Jan. 28, 2025

(54) MULTI-PART GLAZING

(71) Applicant: ACR II GLASS AMERICA INC., Nashville, TN (US)

(72) Inventors: Wladislaw Bronstein, Konz (DE); Olivier Farreyrol, Wasserbillig (LU); Issam Sabra, Metz (FR)

(73) Assignee: ACR II GLASS AMERICA INC., Nashville, TN (US)

( * ) Notice: Subject to any disclaimer, the term of this patent is extended or adjusted under 35 U.S.C. 154(b) by 447 days.

(21) Appl. No.: 17/626,389

(22) PCT Filed: Jul. 17, 2020

(86) PCT No.: PCT/EP2020/070310
§ 371 (c)(1),
(2) Date: Jan. 11, 2022

(87) PCT Pub. No.: WO2021/009356
PCT Pub. Date: Jan. 21, 2021

(65) Prior Publication Data
US 2022/0274466 A1 Sep. 1, 2022

Related U.S. Application Data

(60) Provisional application No. 62/875,134, filed on Jul. 17, 2019.

(51) Int. Cl.
*B32B 3/14* (2006.01)
*B60J 1/00* (2006.01)
(Continued)

(52) U.S. Cl.
CPC ................ *B60J 1/001* (2013.01); *B32B 3/14* (2013.01); *B60J 1/008* (2013.01); *B60J 1/02* (2013.01); *C03C 27/10* (2013.01)

(58) Field of Classification Search
CPC .... B32B 3/14; B32B 7/12; B60J 1/001; B60J 1/008; B60J 1/02
See application file for complete search history.

(56) References Cited

U.S. PATENT DOCUMENTS

| 5,060,440 A | 10/1991 | Weaver |
| 9,656,537 B2 | 5/2017 | Dunkmann et al. |

(Continued)

FOREIGN PATENT DOCUMENTS

| DE | 102014202048 A1 | 8/2014 |
| FR | 2879131 A1 | 6/2006 |

(Continued)

OTHER PUBLICATIONS

International Search Report and the Written Opinion for International Application No. PCT/EP2020/070310, filed Jul. 17, 2020, mailed on Oct. 15, 2020, by International Search Authority/EPO, 12 pages.

(Continued)

*Primary Examiner* — Elizabeth E Mulvaney
(74) *Attorney, Agent, or Firm* — K&L Gates LLP

(57) ABSTRACT

A multi-part glazing according to this disclosure comprises a first glass piece (110) having an outer major surface, a second glass piece (120) having an outer major surface, and an attachment piece (140) provided between the first glass piece and the second glass piece to connect the first glass piece and the second glass piece. The outer major surface of the first glass piece is arranged in a continuous surface with the outer major surface of the second glass piece by a prescribed angle via an outer surface of the attachment piece.

20 Claims, 6 Drawing Sheets

(51) Int. Cl.
*B60J 1/02* (2006.01)
*C03C 27/10* (2006.01)

(56) References Cited

U.S. PATENT DOCUMENTS

| | | |
|---|---|---|
| 9,840,287 B1 | 12/2017 | Mayville et al. |
| 2011/0033667 A1 | 2/2011 | Leconte et al. |
| 2014/0332519 A1* | 11/2014 | Sakamoto ................ H05B 3/04 219/203 |
| 2018/0126826 A1 | 5/2018 | Boettger et al. |
| 2020/0055381 A1 | 2/2020 | DePaoli et al. |
| 2024/0174057 A1* | 5/2024 | Lamoureux ............. B60J 10/70 |

FOREIGN PATENT DOCUMENTS

| | | |
|---|---|---|
| JP | S61-94813 A | 5/1986 |
| JP | H2-149312 U | 12/1990 |
| JP | H5-67514 U | 9/1993 |
| JP | 2007197288 A | 8/2007 |
| JP | 6305042 B2 | 4/2018 |
| WO | 2018060081 A1 | 4/2018 |
| WO | 2018/178574 A1 | 10/2018 |
| WO | 2019130284 A1 | 7/2019 |

OTHER PUBLICATIONS

Examination Report for EP Application No. 20742725.3 dated Jan. 22, 2024.

* cited by examiner

MULTI-PART GLAZING

CROSS REFERENCE TO RELATED APPLICATION

This application is a national stage of PCT International Application No. PCT/EP2020/070310, filed Jul. 17, 2020, and claims priority to U.S. Provisional Application No. 62/875,134 filed on Jul. 17, 2019, entitled "Multi-Part Glazing," the content of which is incorporated herein by reference in its entirety.

TECHNICAL FIELDS

The present disclosure generally relates to a multi-part glazing having multiple glazing parts, which is suitable for vehicle production. The present disclosure also relates to a method for manufacturing such a multi-part glazing.

BACKGROUND

It may be desirable in some instances to provide a glazing having an area or region with a small radius of curvature. Glazings are known in the art which have curvature in one or more directions. The current glass bending processes (which are also used to produce automotive glass), have technical limits, which may not allow for production of a glazing with a very small bending radius, especially when the glass is bent in more than one direction.

As disclosed herein, a multi-part glazing may be provided which includes at least one area having a small radius of curvature. Such glazings may particularly be used in automotive or architectural applications. For example, it may be desirable to apply a glazing around a curved, bent or angled surface, including a corner. In automotive applications, the glazings may be used as windshields, sunroofs or back windows. The point of a smallest radius of curvature (angle, corner or sharpest bend) may be a weak point in a glazing. Stress may form at such a curved surface, which may be susceptible to breaking. Further, some curved shapes may not be possible to produce due to the desired radius of curvature.

SUMMARY OF THE DISCLOSURE

To address such weaknesses in a glazing, products as disclosed herein may be provided. Particularly, a multi-part glazing according to this disclosure may comprise a first glass piece having an outer major surface, a second glass piece having an outer major surface, and an attachment piece provided between the first glass piece and the second glass piece which may connect the first glass piece and the second glass piece at an angle to one another. The outer major surface of the first glass piece and the outer major surface of the second glass piece may be arranged to form, via an outer surface of the attachment piece, a continuous outer surface of the glazing.

As disclosed herein, the first glass piece may be joined with at least one additional glass piece to form a curved shape of a multi-part glazing. In some embodiments, the first glass piece may be the same size as or larger than any other glass pieces of this glazing. The first glass piece may also have a thickness equal to or thicker than that of any other glass pieces of this glazing. Where the multi-part glazing is an automotive glass product, the glass product may include a windshield which wraps around the front pillars of the vehicle or a back window which wraps around the back pillars of the vehicle. A sunroof may have sides which wrap around front, back or side edges of a vehicle. A first glass piece may include the main portion or largest-area portion of a glass product, Such as the main portion of a windshield or a sunroof.

In some embodiments, the first glass piece may be curved or bent in ore than one direction. In certain embodiments, the first glass piece may be or include laminated glass or a single glass sheet. Where the first glass piece is a single glass sheet, the glass may be thermally or chemically tempered. Where the glass product is a windshield, it may be preferable that the first glass piece is made of laminated glass. The first glass piece may also include laminated glass for other glass products, including, for example a sunroof.

The glass product may further include at least one additional glass piece. As with the second piece, the outer major surface of the first glass piece may be arranged as a continuous surface with the outer major surface of the additional glass piece by a prescribed angle via an outer surface of the attachment piece. The or each additional glass piece may preferably be a tempered glass piece, in some embodiments. The glass pieces may be formed with the first glass piece to provide a glass product. The first glass piece may be formed with the additional glass piece(s) to provide a desired shape. The additional glass pieces may be attached to the first glass piece in an area or at a region of the smallest radius of curvature or at a bend or corner region of the multi-part glazing. The attachment piece between the glass pieces may be accomplished by various means, including attaching the glass pieces together with materials and methods similar to those used for glass encapsulation. Attachment may include placing the glass pieces in a mold and filling a space between the glass pieces with an attachment material. The mold may be formed to provide any desired shape to the attachment piece. The attachment piece shape may form an even or smooth surface between the glass pieces and/or may provide a decorative appearance. In some embodiments, the attachment material or piece may provide an additional function, such as a rain guide or a connecting clip. Further, the attachment material may interact with accessories or functional elements located behind the attachment material, in the glass product or where the glass product is installed.

Aspects and preferred aspects of our proposals are set out e claims.

BRIEF DESCRIPTION OF THE DRA WINES

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth in order to promote a thorough understanding of one or more aspects of the disclosure. It may be evident in some or all instances, however, that any aspects described below can be practiced without adopting the specific design details described below.

A multi-part glazing may include two or more glass pieces to form a glazing structure having a shape which may be difficult to form with conventional glass bending methods. The multi-part glazing may include a first glass piece which may form a major portion of the multi-part glazing, such as having the largest area among the glass pieces. At least one additional glass piece may be formed along the first glass piece. For example, a second glass piece may be positioned along an edge of the first glass piece edge-tea-edge in a multi-part glazing. In some embodiments, the first glass piece may be a windshield, a sunroof, or a back window. The multi part glazing may further include additional glass pieces. For example, a multi-part glazing may include a windshield as a first glass piece and second and third glass pieces formed at vehicle pillar regions. Further embodiments may include a sunroof formed with any one or more of a windshield, a back window, and/or side glass pieces. The glass pieces of a multi-part glazing may be attached to each other using resin materials (polymer materials). These materials may be such as are used in encapsulation technologies, and well-known to the skilled person.

Figure 1:
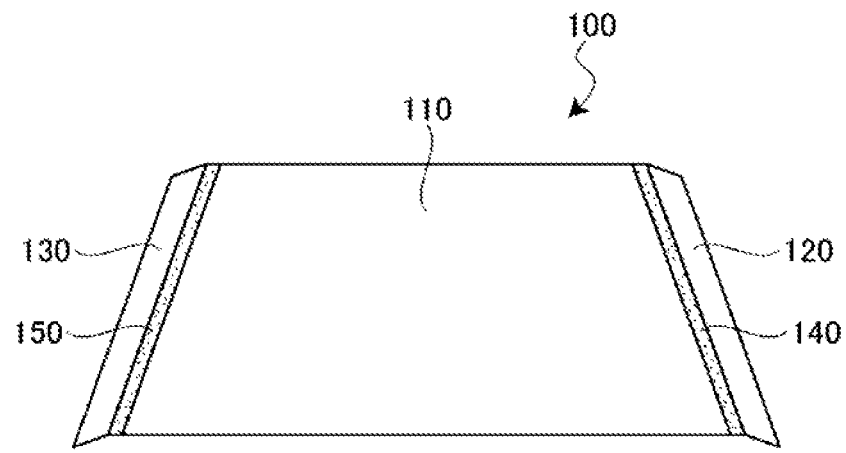
FIG. 1 shows a plan view of a multi-part glazing according to an exemplary embodiment of this disclosure.

Referring to FIG. 1, an example multi-part glazing 100 illustrated as a part assembled for a vehicle. The multi-part glazing 100 may include a first glass piece 110, a second glass piece 120, a third glass piece 130, and a pair of attachment pieces 140,150. The first glass piece 110 may be formed of a laminated glass or single tempered glass. The first glass piece 110 may be a windshield of a vehicle, which may have a substantially trapezoid shape and size to serve as a windshield. A vehicle may include an opening for such a windshield. A top edge of the first glass piece 110 may be shorter than a bottom edge of the first glass piece 110 in some embodiments. The first glass piece 110 may be formed of a glass substrate, which may include soda-lime glass, which may be formed by a float process known, and sized and shaped as desired. The glass substrate may be bent by known methods, such as gravity sag bending or press bending. The first glass piece 110 may include any suitable automotive glass, such as a windshield or a back window. A sunroof may also be a suitable glass piece. and may have one or more additional glass pieces formed along the sides and/or end(s) of the sunroof to form a multi-part glazing.

The first glass piece 110 may typically have a thickness about 2.0 mm to 10.0 mm, preferably from about 2.0 mm to 8.0 mm, more preferably from about 3.0 mm to 6.0 mm. For laminated glass, each glass substrate may typically have a thickness from 0.05 mm to 5.0 mm. For tempered glass, a glass substrate may have a thickness preferably from 2.0 mm to 6.0 mm, and more preferably from 2.5 mm to 5.0 mm. The first glass piece 110 may be flat or may have a curved shape. The first glass piece 110 may be part of multi-part glazing 100 in which a smallest radius of curvature or sharpest bend is not within the first glass piece 110.

The example shown in FIG. 1 includes the second glass piece 120 and third glass piece 130 provided at opposite sides (side edges) of the first glass piece 110. The second and third glass pieces 120,130 may be formed of a glass substrate, typically made of e.g. soda-lime glass, which may be manufactured by float process known in the art. The glass substrate may be bent by known methods, such as gravity sag bending or press bending. The second and third glass pieces 120,130 may be a single glass substrate or of laminated glass having at least two glass substrates laminated together. Where the first glass piece is a windshield, the second and third glass pieces 120,130 may be designed to be positioned in the areas of A pillars located at right and left sides of the windshield in a vehicle. The second and third glass pieces 120,130 may cover part or all of the outer surfaces of the A pillars. The first piece and/or attachment piece may also cover part of the A pillar region. The second and third glass pieces 120,130 may be arranged to form a continuous outer surface with the first glass piece 110 without any significant gap between the first glass piece 110 and the second and third glass pieces 120,130. That is, the outer major surface of the first glass piece 110 may be arranged in a continuous surface with the outer major surfaces of the second and third glass pieces 120,130 by a prescribed angle θ via outer surfaces of the attachment pieces 140,150.

The continuous outer surface at the attachment piece may be flush with the outer major surfaces of the glass pieces 110,120,130, or may be raised in relation to the outer major surfaces of the glass pieces 110,120,130. Thus, as seen in the drawings, wherein each of the adjacent glass edge surfaces has inner and outer extremities, and considering the join/angle region in cross-section, the outer surface of the attachment piece may provide the continuity of the glazing outer surface by substantially meeting the outer extremities of the adjacent glass edges i.e. so as to be flush as mentioned. Still considered in cross-section, the outer surface of the attachment piece may extend straight from one outer edge extremity to the other (as in the drawn embodiments) or it may project out convexly beyond that line.

Figure 3:
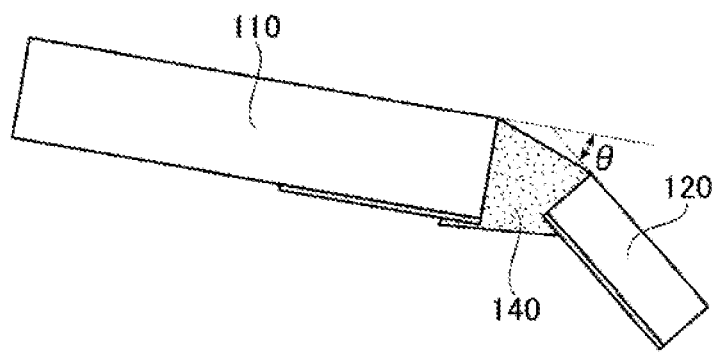
FIG. 3 shows a cross-section of a multi-part glaring according to an exemplary embodiment of this disclosure.

FIG. 3 shows the prescribed angle θ, which is an angle formed by extension lines of the outer major surface of the first glass piece and a major surface of the second or third glass piece 120,130. The outer surfaces of the attachment pieces 140,150 may be arranged to provide a straight or curved surface between the first glass piece 110 and the second and third glass pieces 120,130. The design of the multi-part glazing 100 according to this disclosure may be flexible as to gaps between the outer surfaces of the pieces 110,120,130,140,150. The attachment pieces 140,150 may be arranged without any gap or with a gap between the glass pieces 110,120,130. A small gap between the glass pieces 110,120,130 may be e.g. less than 5 mm. The angle θ may preferably be chosen from a range of 10 to 90 degrees. In an example design of the multi-part glazing, the outer surfaces of the attachment pieces 140,150 may be continuous with the outer major surfaces of the first to third glass pieces 110,120,130.

The first glass piece 110 may be at least the size (or area) of the second glass piece 120 and the third glass piece 130, or larger. In the embodiment shown in FIG. 1, the first glass piece 110 may serve as a windshield, whereas the second and third glass pieces 120,130 may cover the A pillars, so the first glass piece 110 is designed larger than the second and third glass pieces 120,130. In regard to the thickness of the glass pieces, the first glass piece 110 may have a thickness greater than or equal to a thickness of the second glass piece 120 and the third glass piece 130. The first glass piece 110 may preferably have a thickness in a range of about 2.0 mm to 10.0 mm, and the second and third glass pieces 120, 130 may be designed to have a thinner thickness such as, e.g., 0.05 mm to 6.0 mm, depending on the design feature of the vehicle to be assembled. A ratio of the thickness of the first glass piece 110 to the thickness of the second or third glass piece 120,130 may be from 1:0.1 to 1:0.9, preferably 1:0.2 to 1:0.8. In some embodiments, the glass pieces 110,120,130 may have side edges having surfaces perpendicular to the major surfaces of the glass pieces 110,120,130 or side edges having surfaces inclined (i.e. non-perpendicularly) in relation to the major surfaces of the glass pieces 110,120,130.

The attachment pieces 140,150 may be formed of any suitable materials, such as e.g. a resin material. Where the attachment pieces 140,150 may be exposed to the exterior of a vehicle, durability of the attachment material against weather, temperature, humidity, ultraviolet rays, some liquid, such as salt water, etc. may be required to withstand exposure to such elements. A resin material used for the attachment pieces 140,150 may be thermosetting or a thermoplastic resin, and may be e.g. epoxy resin, phenolic resin, polyimide, polyurethane, ABS (acrylonitrile butadiene styrene) resin, polycarbonate, acrylic resin, polyamide, POM (polyacetal) resin, PBT (poly butylene terephthalate) resin, etc., or a combination of resins, fiber reinforced resin materials, elastomers etc. The attachment pieces 140,150 may adhere to the surfaces of the glass pieces 110,120,130 of the multi-part glazing 100. The attachment pieces 140, 150 may be rigid, or may be elastically deformed/deformable to render the assembly process of a multi-part glazing 100 easier.

In one method of preparing a multi-part glazing 100, the attachment pieces 140,150 may be formed by the introduction of a resin material or materials into a mold. The attachment pieces 140,150 may have a bar shape fitting around or along the edges of the glass pieces. As in the example shown in FIG. 1, the attachment pieces 140,150 may fit around/along the edges of the glass pieces extending along the A pillars. The attachment pieces 140,150 may have substantially the same length as the second and third glass pieces 120,130.

In some embodiments, a reinforcement such as a metal reinforcement may be provided within the attachment pieces 140,150. For example, a metal piece may be provided in a mold between the first and additional glass pieces prior to filling the space with a resin material. In certain embodiments, such a reinforcement may be provided in the form of a wire, a strip, or a frame. The reinforcement may provide additional support to the multi-part glazing.

A multi-part glazing 100 may be pro assembled before attachment to the frame of a vehicle. During the vehicle manufacturing process, the multi-part glazing 100 as a single part may be handled by e.g. a robot arm, with the first glass piece 110 already connected to the second and third glass pieces 120,130 via the respective attachment pieces 140,150. The multi-part glazing 100 may be instantly installed at one time and may provide a streamlined appearance when installed in a vehicle. The multi-part glazing 100 may have some flexibility at the attachment pieces 140,150 wherein such flexibility may aid in the installation of the multi-part glazing 100.

Figure 2:
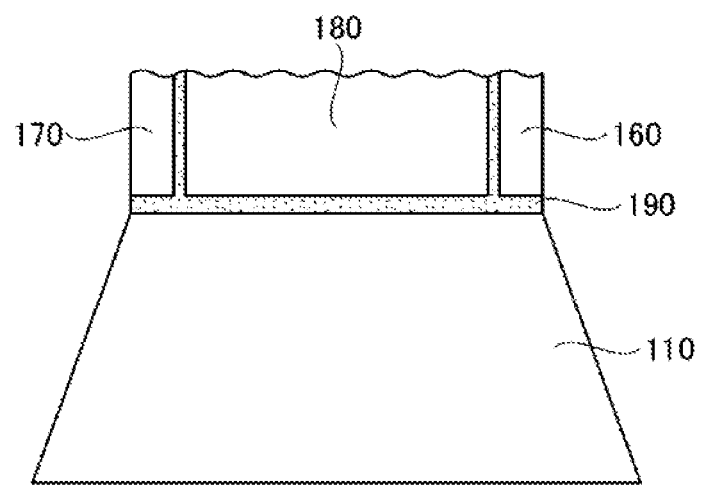
FIG. 2 shows a plan view of another multi-part glazing according to an exemplary embodiment of this disclosure.

FIG. 2 shows another embodiment of a multi-part glazing. The multi-part glazing shown in FIG. 2 may include the first glass piece 110 which may be a windshield, a second glass piece 160, a third glass piece 170, and a fourth glass piece 180. The second, third, and fourth glass pieces may be connected by an attachment piece 190 extending horizontally at the top edge of the windshield. In some embodiments, the first glass piece 110 may include or constitute a back window. The attachment piece 190 may further extend between the second and third glass pieces 160,170 and the fourth glass piece 180, The fourth glass piece 180 may include a sunroof which may extend across a major portion of the vehicle roof, in at least one direction, when installed. The second and third glass pieces 160,170 shown may be assembled over a part of the root of the vehicle along the sides of a sunroof Glass pieces used in a multi-part glazing as described herein may be positioned over any suitable part of a vehicle when installed, including around a front, back, or roof the vehicle.

Figure 11:
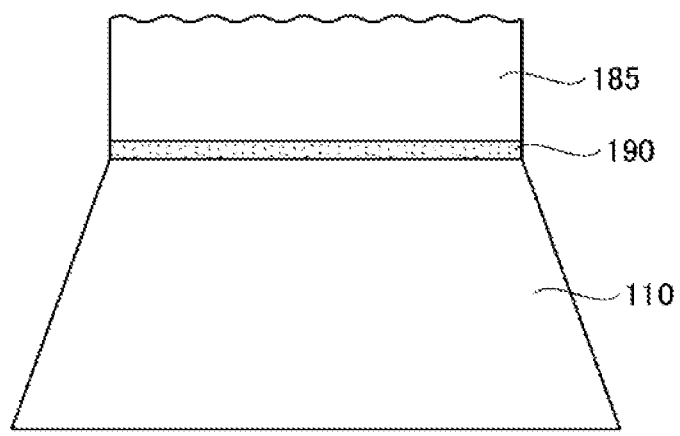
FIG. 11 shows a plan view another multi-part glazing according to an exemplary embodiment of this disclosure.

FIG. 11 shows another embodiment of the multi-part glazing described herein. The first glass piece 110 may include a windshield or a back window, and the second glass piece 185 may be a sunroof. The First and second glass pieces 110,185 may be connected at an attachment piece 190. In further embodiments, a third glass piece may be formed in the a multi-pan glazing to provide a back window attached to the second glass piece 185 in addition to a windshield.

Figure 4:
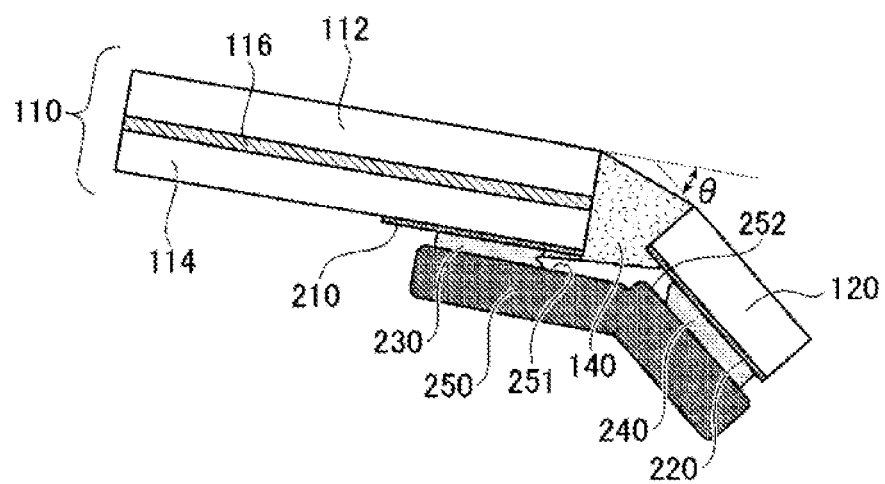
FIG. 4 shows a cross-section of the multi art glazing shown in FIG. 3 when assembled to a vehicle.

FIG. 4 shows a cross-section of an example at the meeting point or meeting line or angle of two glass pieces with an attachment piece in multi-part glazing according to the present disclosure. As shown in FIG. 4, the first glass piece 110 may be formed of a first glass substrate 112 having an outer major surface, and a second glass substrate 114 provided on an inner side of the vehicle, and an interlayer polymer 116 provided between the first glass substrate 112 and the second glass substrate 114. The second glass piece 120 may be attached to the first glass piece via the attachment piece 140. The outer surface of the first glass substrate 112 may be arranged as a continuous surface with the outer major surface of the second glass piece 120 via an outer surface of the attachment piece 140. The outer surfaces of the first glass substrate 112, the attachment piece 140, and the second glass piece 120 may be continuous without any significant gap and may collectively form the outer surface of the multi-part glazing, extending around the angle or corner at the edge-to-edge join line. The point of the smallest radius of curvature of the multi-part glazing and the multi-part glazing outer surface may be located in an area of the outer surface of the attachment piece 140. In some glazings, the smallest radius of curvature of the multi-part glazing outer surface may be at a point of the multi-part glazing in line with an intersection of extension lines of the glass piece surfaces. Such an intersection of the lines, which limn angle θ, may be at a point which has a smallest distance from the multi-part glazing at the point of the smallest radius of curvature of the multi-part glazing outer surface. From a distance, the attachment piece 140 can be regarded as a bend point with the smallest radius of curvature between the glass pieces 110,120, although considered close up the outer surface of the attachment 140 may be flat between the glass pieces 110,120. In some other embodiments, the attachment piece 140 may have a curved outer surface extending between the glass pieces 110,120. The multi-part glazing described herein may provide design flexibility for a vehicle in relation to the relationship between the glass pieces 110,120 and a radius of curvature across the entire glazing. Because the attachment piece 140 may be made of the resin material, the smallest radius of curvature in the multi-part glazing may be realized more easily than through bending the glass, which may have technical limits. The smallest radius of curvature of the multi-part glazing outer surface may not be more than 1000 mm, preferably not more than 500 mm, more preferably not more than 100 mm.

An A pillar 250 may be provided as a part of the vehicle frame. In an example, the A pillar 250 may have two component members 251,252. One member 251 may extend along the inner surface of the second glass substrate 114 of the first glass piece 110, and the other pillar member 252 may extend along the inner surface of the second glass piece 120. To secure the multi-part glazing to the outer side of the A pillar 250, adhesive 230,240 may be applied between inner surfaces of the first glass piece and the second glass piece 120, respectively, and the A pillar 250. For maintaining an aesthetic appearance of the vehicle, the adhesive 230,240 may be concealed easily by forming opaque layers stitch as black ceramic layers 210,220 on the first glass piece 110 and the second glass piece 120, respectively. The black ceramic layer 210 on the first glass piece 110 may be formed on either the first glass substrate 112 or the second glass substrate 114. The black ceramic layers 210,220 may hide the adhesive 230,240 from view, so that the adhesive 230, 240 may be any color and may not be required to be applied uniformly as long as adhesive strength is maintained. The black ceramic layers 210,220 may also protect the adhesive from degradation due to UV exposure. The black ceramic layers 210,220 may be formed by printing the black ceramic material onto a glass substrate. The first and second glass pieces 110,120 may include portions of non-printed area through which a vehicle passenger may view an environment outside of the vehicle. Typically printed opaque layer is in the form of a band extending along a peripheral region of the glass piece, as shown.

Referring to FIG. 5 to FIG. 8, an attachment method for producing a multi-part glazing is illustrated. In the attachment method shown, an attachment material 360 may be applied to a mold between the glass pieces 310,320 and cured to form the attachment piece and provide the multi-part glazing. The attachment material 360 may include a polymer material, including a polyurethane and/or polyvinyl chloride, or other suitable binding material. The attachment material may be colored or not colored. Where the attachment material is colored, the glass pieces may be printed with a matching color, such that the attachment material may be less apparent. Particularly, a colored attachment material may be black. The attachment material may provide the area of the glass product having the smallest radius of curvature in the glass product. In some embodiments, the attachment material may further extend around the outer perimeter of the multi-part glazing, so as to encapsulate the multi-part glazing.

Figure 5:
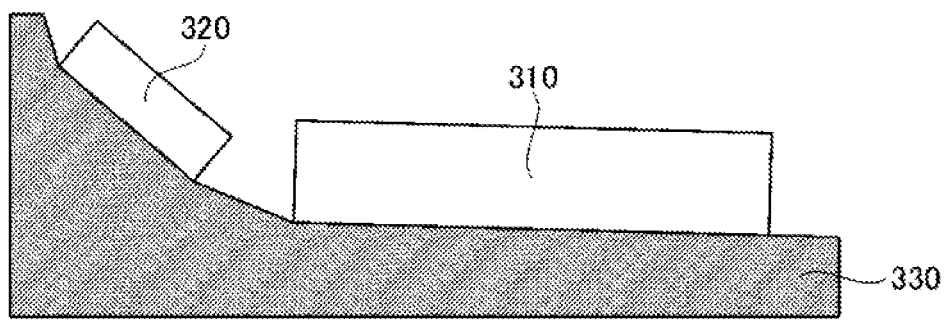
FIG. 5 shows a diagram for illustrating parts setting process of a multi-part glazing according to an exemplary embodiment of this disclosure.

First, as shown in FIG. 5, a first mold half 330 serving as a lower mold half may be prepared, and a first glass piece 310 and a second glass piece 320 may be set on the surface of the first mold half 330. If a third glass piece is needed, to connect the third glass piece to the first glass piece, the third piece, not shown, may be added on the surface of the first mold half 330. The first mold half 330 may have a shape such that a desired shape (mutually angled alignment for the glazing product) is maintained between the glass pieces 310, 320.

Figure 6:
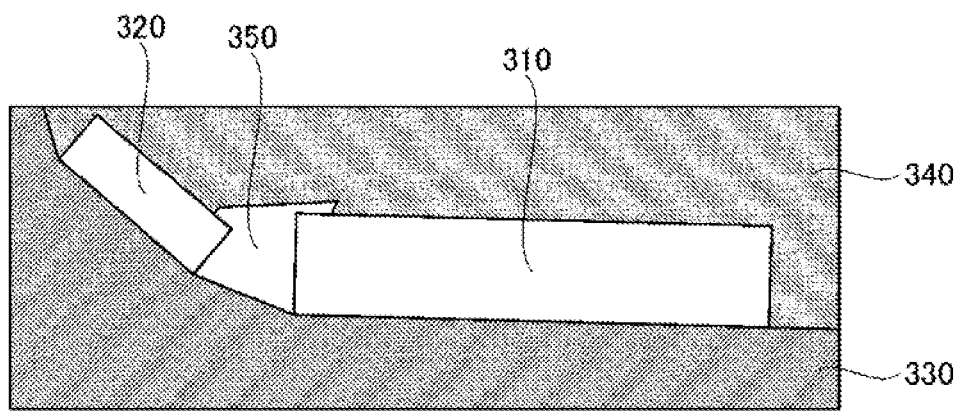
FIG. 6 shows a diagram for illustrating a mold setting process of the multi-part glazing according to an exemplary embodiment of this disclosure.

After setting each glass piece, a second mold half 340 may be positioned over the first mold half 330 to form a cavity 350 at an area between the first glass piece 310 and the second glass piece 320 as shown in FIG. 6. The first and second mold halves 330,340 may be generally made of a metal, such as stainless steel. The mold halves may include any thermally controlling method, such as cooling. If black ceramic layers are required, black printing may be done before this setting of the glass pieces.

Figure 7:
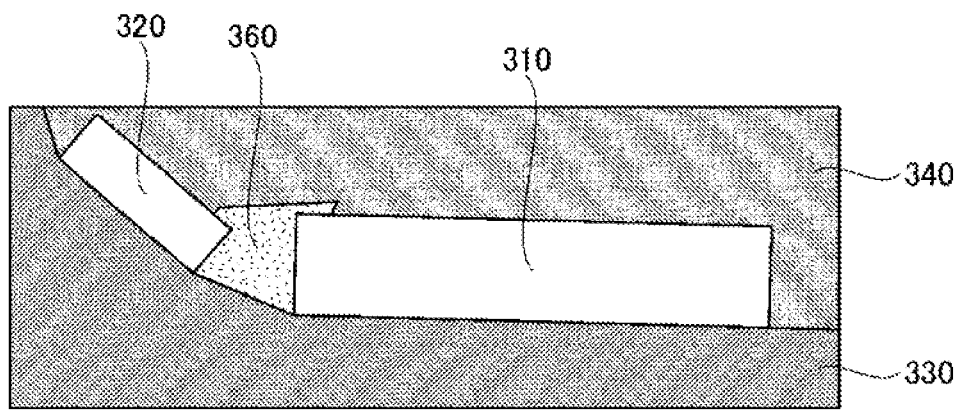
FIG. 7 shows a diagram for illustrating a resin introducing process of the multi-part glazing according to an exemplary embodiment of this disclosure.

Subsequently, a shown in FIG. 7, a resin material 360 may be introduced into the cavity 350 to form an attachment piece having a shape reflecting the shape of the cavity 350. To introduce the resin material 360 into the cavity 350 of the mold halves 330,340, an injection molding method or any other means may be used.

Figure 8:
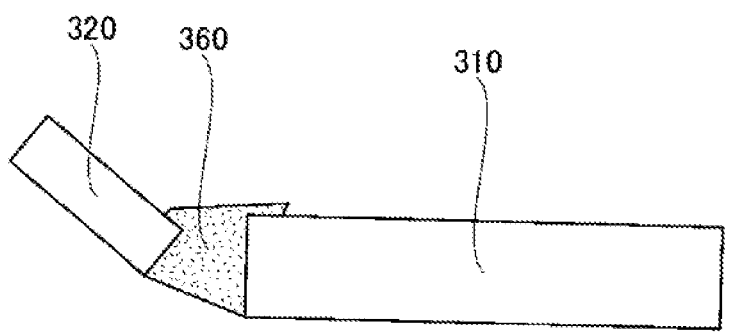
FIG. 8 shows a diagram for illustrating a mold releasing process of the multi-part glazing according to an exemplary embodiment of this disclosure.

After the introduction of the resin material 360 for forming the attachment piece, and any necessary curing, if any, of the resin material 360, the first mold half 330 and the second mold half 340 may be separated to release the molded multi-part glazing from the mold halves. This multi-part glazing, as shown in FIG. 8, may include the first glass piece 310, the second glass piece 320, and the attachment piece made of the resin material 360 having the shape reflecting the shape of the cavity 350.

Figure 9:
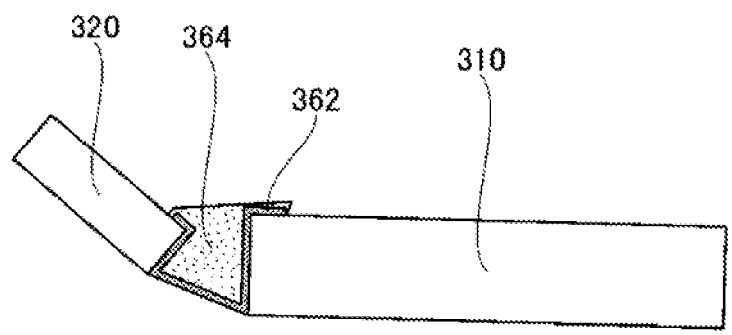
FIG. 9 shows a diagram for illustrating another production process of the multi-part glazing according to in exemplary embodiment of this disclosure.

Alternatively, the molding for forming the attachment piece may be executed by a bicolor or bi-material molding method in which two types of resin materials are introduced in the cavity between the mold halves. As shown in FIG. 9, with such a bicolor or bi-material molding, the attachment piece may be formed of two resins. For example, an outer resin material 362 may be chosen to increase the adhesiveness between the attachment piece the glass piece, such that a resin material having a strong adhesive property may be selected. On the other hand, an inner resin material 364 may be chosen to increase the rigidity of the attachment, such that the multi-part glazing may enjoy an appropriate strength to support the first and second glass pieces 310,320. The attachment piece may be produced with well-balanced aspects of rigidity and adhesiveness as designed for the glazing in any method of production.

Figure 10:
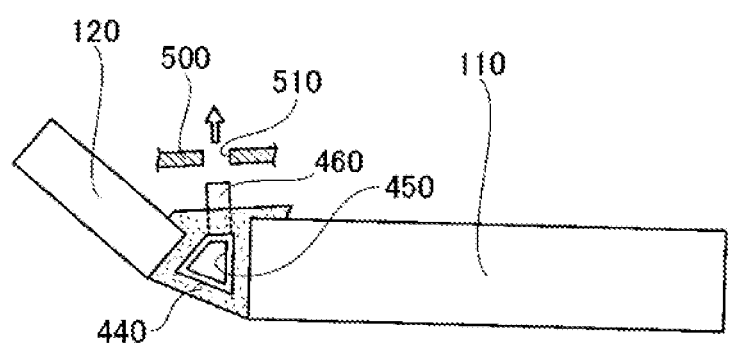
FIG. 10 shows a cross-section of a multi-part glazing when installed in a vehicle, according to an exemplary embodiment of this disclosure.

As shown in FIG. 10, an attachment piece 440 may include a structural member 450 encapsulated with a resin material for connecting the first glass piece 110 and the second glass piece 120. The structural member 450 may be formed of metal or metal alloy materials or plastic materials such as, e.g., stainless steel, fiber-reinforced plastic materials, or carbon fibers in a bar shape and may be embedded in the resin material. The structural member 450 may be formed with a locating pin 460 formed projecting from the surface of the structural member 450, and the locating pin 460 may fit to a bore 510 formed in a pillar frame 500 of the vehicle. This connection between the locating pin 460 and the bore 510 may enable improved assembly alignment.

An attachment piece may provide an additional function, such as a rain guide or a connecting clip. Some encapsulated structural members may operate as or be equipped with electronics devices for providing light signals or picking up electromagnetic waves, or with electrical wirings for connecting a roof side with an engine room side. Furthermore, the encapsulated structural member may interact with accessories or functional elements in the vehicle located behind the encapsulated structural member, in the glass product or where the glass product is installed. The attachment piece may include any of structural members, frames, or electrical devices or parts used for operation of vehicles. Such a device may be embedded entirely or may be placed in a groove formed in the attachment piece in a way that the device is exposed partly from the back side of the attachment piece.

In some embodiments, the first glass piece may be coated or include a functional film laminated therein. The additional glass pieces may include the same or different coatings or functional films as the first glass piece in some embodiments, however, further embodiments may include additional glass pieces without coatings or functional films.

The glass products disclosed herein may be provided as a single unit, such that the glass product having multiple glass pieces may be installed as single piece. A resin material for an attachment piece may have some flex such that the curved parts of the glass product may be placed in or on a receiving frame, including a vehicle frame. Glass pieces used in a multi-part glazing described herein may be in a fixed relationship to each other, such that the glass pieces may not open and close individually. Where there is more than one additional glass piece in a glass product, the same or different attachment materials may be used to bond the additional glass pieces to the first glass piece. The additional glass pieces may be the same or different glass compositions and may have different adhesion qualities. Further, the positioning of the additional glass pieces may preferably have different attachment materials. For example, it may be preferable that a glass product include both clear attachment materials and colored attachment materials.

In the description above, for purposes of explanation and not limitation, the examples with specific details are set forth to provide a thorough understanding of the present disclosure. However, it will be apparent to those having ordinary skill in the art that other embodiments with various modifications and variations may be practiced without departing from the spirit and scope of the present disclosure.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A multi-part glazing, comprising:
   a first glass piece having an outer major surface;
   a second glass piece having an outer major surface; and
   a first attachment piece provided between the first glass piece and the second glass piece to connect the first glass piece and the second glass piece,
   wherein the outer major surface of the first glass piece is arranged in a continuous surface with the outer major surface of the second glass piece via an outer surface of the first attachment piece, and
   the outer surface of the first attachment piece is flush with the outer major surfaces of the first glass piece and the second glass piece.

2. The multi-part glazing according to claim 1, wherein the first glass piece is the same size as or larger than the second glass piece.

3. The multi-part glazing according to claim 1, wherein the first glass piece has a thickness greater than or equal to a thickness of the second glass piece.

4. The multi-part glazing according to claim 1, further comprising a third glass piece, wherein the second glass piece is on one side of the first glass piece and the third glass piece is on an opposite side of the first glass piece, and
   a second attachment piece provided between the first glass piece and the third glass piece to connect the first glass piece and the third glass piece,
   wherein the outer major surface of the first glass piece is arranged in a continuous surface with the outer major surface of the third glass piece via an outer surface of the second attachment piece, and
   the outer surface of the second attachment piece is flush with the outer major surfaces of the first glass piece and the third glass piece.

5. The multi-part glazing according to claim 1 wherein the first glass piece comprises a laminated glass piece, and wherein the laminated glass piece comprises a first glass sheet, a second glass sheet, and a polymer interlayer arranged between the first and second glass sheets.

6. The multi-part glazing according to claim 1, wherein the outer surface of the first attachment piece, the outer major surface of the first glass piece, and the outer major surface of the second glass piece form an outer surface of the multi-part glazing, and wherein the outer surface of the first attachment piece is at the smallest radius of curvature in the outer surface of the multi-part glazing.

7. The multi-part glazing according to claim 6, wherein the smallest radius of curvature in the outer surface of the multi-part glazing is smaller than the allowable curvature of the first glass piece and the second glass sheet.

8. The multi-part glazing according to claim 6, wherein the smallest radius of curvature among the surfaces in the surface continuation is not more than 1000 mm.

9. The multi-part glazing according to claim 1, wherein at least one of the first glass piece and the second glass piece has an inner surface printed with a black ceramic layer.

10. The multi-part glazing according to claim 1, wherein the multi-part glazing is assembled as a part of a vehicle, and wherein the multi-part glazing wraps front pillars or rear pillars of the vehicle when assembled.

11. The multi-part glazing according to claim 1, wherein the first glass piece is a vehicle windshield, a vehicle rear window or a vehicle sunroof.

12. The multi-part glazing according to claim 1, wherein the first attachment piece includes a structural member used for assembling.

13. The multi-part glazing according to claim 1, wherein the first attachment piece includes a structural member providing a function for a vehicle.

14. The multi-part glazing according to claim 1, wherein the first attachment piece includes a structural member configured to interact with an accessory in the vehicle.

15. A method for producing a multi-part glazing, the method comprising:
   preparing a first mold half and placing first and second glass pieces on prescribed positions on the first mold half;
   setting a second mold half over the first mold half and the first and second glass pieces such that there is a cavity between the first and second glass pieces;
   introducing a resin material into the cavity between the first and second mold halves to form an attachment piece; and
   releasing the first and second mold halves from the first and second glass pieces and the resin material to obtain the multi-part glazing.

16. The method for producing a multi-part glazing according to claim 15, wherein introduction of the resin material is done by a bicolor molding.

17. The method of claim 15 producing a multi-part glazing as defined in claim 1.

18. The multi-part glazing according to claim 13, wherein the structural member operates as or is equipped with an electronics device for providing light signals or picking up electromagnetic waves, or with electrical wiring for connecting a roof side with an engine room side.

19. The multi-part glazing according to claim 9, wherein adhesive is applied to at least one of the black ceramic layers on the first glass piece or the second glass piece.

20. The multi-part glazing according to claim 1, wherein the first attachment piece is formed with an outer resin material and an inner resin material.

* * * * *